United States Patent [19]

Mischler

[11] 4,090,330

[45] May 23, 1978

[54] CORRECTION DEVICE FOR THE ROLLING TYPE TENSION ON A GEAR GRINDING MACHINE

[75] Inventor: Eduard Mischler, Regensdorf, Switzerland

[73] Assignee: Maag Gear-Wheel & Machine Company Limited, Zurich, Switzerland

[21] Appl. No.: 816,270

[22] Filed: Jul. 15, 1977

[30] Foreign Application Priority Data

Jul. 30, 1976  Germany .............................. 2634305

[51] Int. Cl.² ............................................. B24B 19/00
[52] U.S. Cl. ................................................ 51/123 G
[58] Field of Search ............ 51/56 G, 95 GH, 95 LH, 51/123 G, 287; 74/99 R, 108

[56] References Cited

U.S. PATENT DOCUMENTS

| | | | |
|---|---|---|---|
| 2,850,851 | 9/1958 | Graf | 51/123 G |
| 3,263,372 | 8/1966 | Erhardt | 51/123 G |
| 4,045,917 | 9/1977 | Loos | 51/123 G |

*Primary Examiner*—N. P. Godici
*Attorney, Agent, or Firm*—Werner W. Kleeman

[57] ABSTRACT

A correction device for the rolling tape tension on a gear grinding machine, especially a form grinding machine for spur and helical cylindrical gears, comprising tapes subjected to an initial basic tension at rest, the tapes being attached at one end to a rolling block, and there occurring between the rolling block and the tapes a relative rolling action. The tapes are attached at their other end to a tape stand which is movable to-and-fro. At the tape stand intermediate pieces or tape clamps are mounted on a device which imparts an additional torque on the rolling block. A gauging device measures the tension in the rolling tapes and compares it with the initial tension of the system at rest. In the event of a decrease in the tape tension relative to the initial tension on one side of the rolling block such gauging device actuates the device which produces an additional torque on the opposite side of the rolling block until the gauged tension on the one side of the rolling block again attains the level of the initial tension.

4 Claims, 1 Drawing Figure

CORRECTION DEVICE FOR THE ROLLING TYPE TENSION ON A GEAR GRINDING MACHINE

BACKGROUND OF THE INVENTION

The present invention relates to a new and improved construction of a correction device with a rolling tape tension on a gear grinding machine, especially a form grinding machine for spur and helical cylindrical gears, comprising tapes subjected to an initial basic tension at rest, these tapes being attached at one end to a rolling block, there occurring between the rolling block and such tapes a relative rolling action, with the tapes being attached at their other end to a tape stand which is movable to-and-fro, and at such tape stand intermediate pieces or tape clamps are mounted on a device or means which imposes an additional torque on the rolling block.

According to a prior art correction device of the fore-going type, as taught for instance in German Pat. No. 1,178,676, there is provided a device for imposing an additional torque on the rolling block, which is in the form of couplings which are only active in one direction and designed so as to exert a torque of pre-adjustable magnitude and duration in order to thereby impose onto the tapes additional stress or to stress relieve such tapes in order to equalize their strain or elongation. The torque must be so pre-adjusted that when grinding gears by the generating method a tooth flank is contacted by the reciprocating grinding wheel during both forward and backward generating strokes, even if the set depth of cut is very small. It is therefore intended to prevent that due to unequal elastic deformation of the generating mechanism, especially stretching of the rolling tapes in the one or the other direction because of the inertia and friction in the generating transmission or drive, the tooth flank is only ground during the forward or return stroke of the grinding wheel. For this purpose, an additional torque which is pre-adjusted according to practical experience can have the desired effect.

Another prior art device employed on gear grinding machines which are controlled with rolling block and rolling tapes contemplates either displacing the tape stand in rhythmic synchronism with the generating action, or in the same rhythm to increase the tension in the rolling tape on one side of the rolling block and to decrease the tension in the rolling tape on the other side of the rolling block, in order to correct the tooth flanks in the sense of tip or root relief. Significant in this regard are German Patent publication Nos. 20 59 521, 24 55 808, and 24 59 033.

SUMMARY OF THE INVENTION

In contrast to the foregoing, the present invention is concerned especially with problems which arise during gear grinding owing to the vastly differing degrees of hardness distortion between one gear and the other, and from the one-sided pressure to which the grinding wheel is subjected at the extremities of the active part of ech grinding stroke, especially in the case of large helix angles. Hardness distortion can be extremely irregular, not only from charge to charge and from gear to gear but also across the facewidth of each individual gear. The unpredictable effects of differing hardness distortion and the one-sided pressure as the grinding wheel moves into and out of engagement cannot be counteracted with an additionally imposed torque which only can be pre-adjusted in conventional manner.

Moreover, exactly the same problems are encountered with non-hardened gears which are brought to the grinding machine from inaccurate pre-machining devices.

Therefore, it is a primary object of the present invention to provide an improved correction device of the initially described type, which, especially for the form grinding of cylindrical spur and helical gears, counteracts the heretofore detrimental effect of varying hardness distortion and varying pressure at first and final points of contact of the grinding wheel.

Now in order to implement this object, and others which will become more readily apparent as the description proceeds, the invention contemplates the provision of a gauging device which measures the tension in the rolling tapes and compares it with the initial tension of the system at rest. In the event of a decrease of such tension relative to the initial tension on one side of the rolling block the gauging device actuates the device for producing an additional torque on the opposite side of the rolling block, until the gauged or measured tension on the one side of the rolling block again attains the level of the initial tension.

Furthermore, the correction device for rolling tape tension as contemplated by the invention, automatically adjusts itself to asymmetrical and uneven grinding pressure across the gear teeth in such a manner that tooth flanks of very high precision can be obtained notwithstanding any and all irregularities.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE illustrates an exemplary embodiment of a grinding machine in perspective view which is provided with a correction device for rolling tape tension on a form grinding machine and constructed according to the teachings of the present invention.

DETAILED DESCRIPTION OF THE PREFERRED EMBODIMENTS

Figure 1:
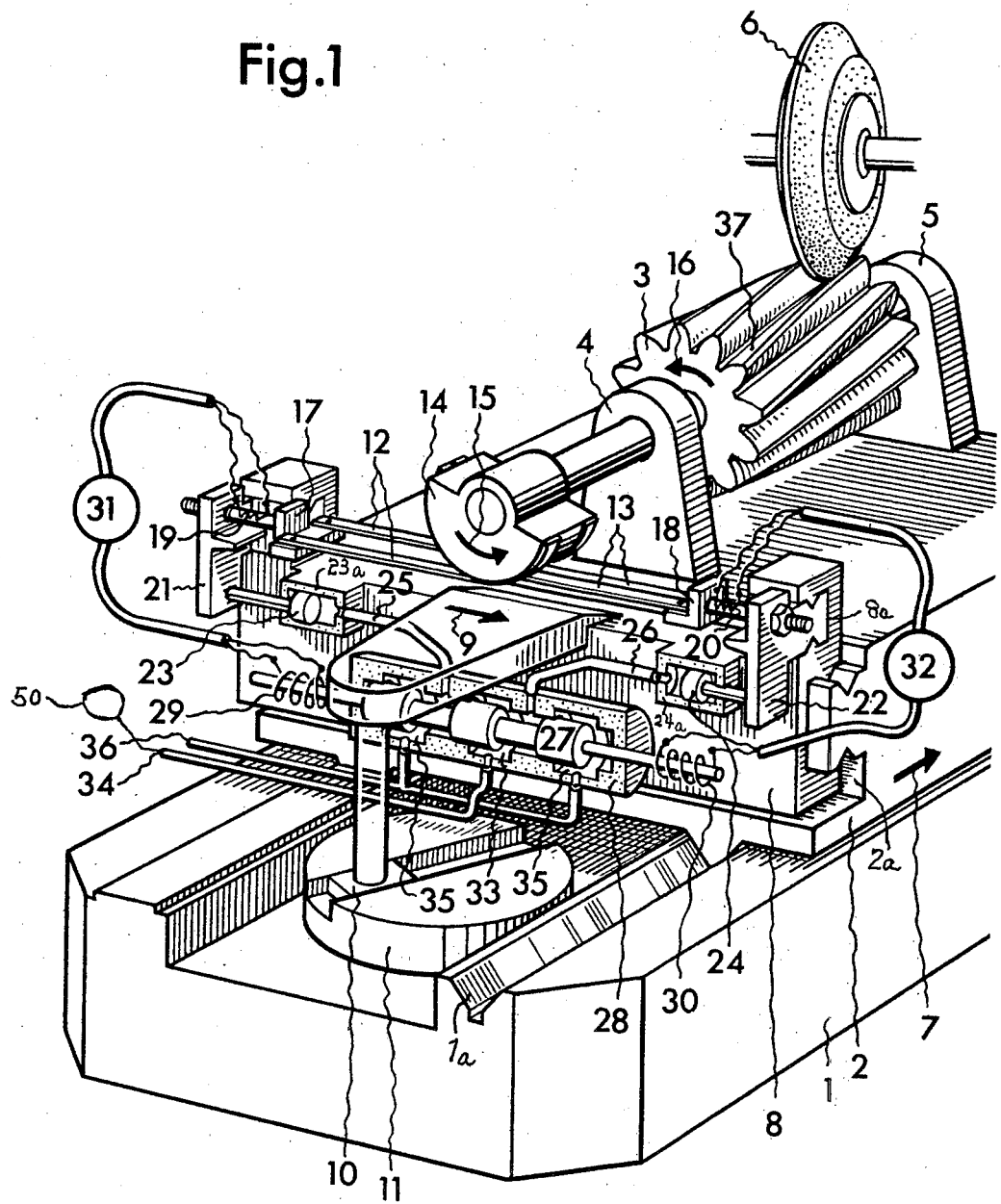

Describing now the drawing, it will be seen that an axial feed carriage 2 is located on guideways 1a on a bed 1. A workpiece 3 having helical teeth is mounted for rotary movement in bearing housings 4 and 5 on the axial feed carriage 2. Mounted in another not particularly illustrated part of the machine is a form grinding wheel 6 which works in a tooth space of the workpiece 3. One of the directions of motion of the axial feed carriage 2 is indicated by the arrow 7. A tape stand 8 is located on guideways 2a on the axial feed carriage 2 for carrying out a to-and-fro motion essentially at right angles to the direction of movement of the axial feed carriage 2. One direction of movement of the tape stand 8 has been indicated by arrow 9. A sliding block 10 which engages in a guide 11 is mounted at the tape stand 8, the guide 11 being attached to the bed 1 so as to be inclinable or obliquely positionable relative to such bed 1, as shown. The guide 11 is obliquely or inclinably arranged in the exemplary embodiment under discussion in such a manner that movement of the axial feed carriage 2 in the direction of the arrow 7 causes a transverse movement of the tape stand 8 in the direction of the arrow 9.

Two rolling tapes 12 and two rolling tapes 13, each under a certain initial tension or stress, are attached to the tape stand 8. The other ends of the rolling tapes 12 and 13 are fastened to a rolling block 14 which is arranged coaxially with respect to the workpiece 3 and rigidly coupled to the same to carry out a like rotational movement so that any movement of the tape stand 8 in the direction of for instance the arrow 9, consequently causes a rotation of the rolling block 14 and the workpiece 3 in the direction of the arrows 15 and 16 respectively. The intermediate pieces or tape clamps 17 and 18 provide a connection between the rolling tapes 12 and 13, respectively, and the tape stand. Each of such intermediate pieces or tape clamps 17 and 18 is provided with a strain gauge 19 and 20 respectively, serving as measuring means and adjustably attached to a respective anchor bar or carriage 21 and 22. The two carriages or anchor bars 21 and 22 are located on the tape stand 8 in guideways 8a extending essentially parallel to the direction of movement of the tape stand and the lengthwise direction of extent of the rolling tapes 12 and 13. These carriages or anchor bars 21 and 22 are fixedly attached to pistons 23 and 24 respectively, these pistons 23 and 24 operatively reciprocating in a cylinder 23a and 24a, respectively, incorporated in the tape stand 8. These cylinders 23a and 24a are hydraulically connected via pipes 25 and 26, respectively, to a control housing 28 divided by a control piston or spool valve 27. The control piston 27 is connected at each end to a solenoid 29 and 30 respectively, wherein it will be seen that the solenoid 29 is connected to the strain gauge 19 by means of the electronic control unit 31, whereas the solenoid 30 is connected to the strain gauge 20 by means of the electronic control unit 32. The pressurized chamber 33 of the control housing 28 is connected to a pump, schematically indicated by reference character 50, by means of a pipe or conduit 34, and the pressure-relieved chambers 35 of the control housing 28 are connected to a conventional and therefore not further illustrated oil reservoir by means of a pipe or conduit 36.

Throughout the movements of the components of the system which correspond to the arrows 7, 9, 15 and 16, the lateral pressure acting upon the form grinding wheel 6 working in a tooth space of the workpiece 3 with evenly distributed material allowance is balanced, and the rolling tapes 12 and 13 are equally subjected to the initial tension or stress.

If, however, due to hardness distortion, the material allowance or accumulation becomes greater, for instance on the tooth flank 37, or upon the grinding wheel 6 leaving the helical tooth space such grinding wheel becomes non-symmetrically loaded, then the contact pressure on the grinding wheel 6 becomes one-sided and the rolling tapes 13 are subjected to a higher tension, i.e. strain. Hence, the strain gauge 19 thus records a tension or stress which is below the preset initial tension, while the strain gauge 20 records a tension or stress above the preset initial tension, so that the solenoid 29 shifts the control piston 27 and the piston 24 is subjected to additional pressure loading via the pipe or conduit 26. Consequently, the rolling tapes 13 and along therewith the strain gauge 20, are tensioned still higher until the rolling tapes 12, and with them the strain gauge 19, have regained the preset initial tension.

Conversely, if the material allowance or accumulation increases on the flank opposite to the flank 37, then, the rolling tapes 12 are subjected to a greater strain. Strain gauge 20 then records a tension or strain below the initial level, whereupon the solenoid 30 shifts the control piston 27 and the piston 23 is subjected to additional pressure loading by means of the pipe or conduit 25 until the rolling tapes 13 regain the specified initial tension. In this manner, the contact pressure upon the grinding wheel 6 is controlled in accordance with the irregular hardness distortion such that there is maintained an extremely high precision with respect to the desired tooth alignment or helix angle.

While there are shown and described present preferred embodiments of the invention, it is to be distinctly understood that the invention is not limited thereto, but may be otherwise variously embodied and practiced within the scope of the following claims.

What I claim is:

1. A correction device for the rolling tape tension on a gear grinding machine, especially a form grinding machine for spur and helical cylindrical gears, comprising:
    tapes subjected to an initial basic tension at rest;
    a rolling block to which one end of each of the tapes is attached;
    said rolling block and said tapes coacting with one another such that a relative rolling action occurs therebetween;
    a tape stand mounted to be movable to-and-fro at which the other end of each of the tapes is attached;
    said mounting means including intermediate pieces defining tape clamps at which the other end of said tapes are attached, said intermediate pieces being carried by said tape stand;
    means for imposing an additional torque on the rolling block and cooperating with said intermediate pieces;
    gauging means for measuring the tension in the rolling tapes and for comparing the same with the initial basic tension at rest;
    said gauging means, in the event of a decrease in the tension of the tapes relative to the initial tension on one side of the rolling block actuating said torque imposing means to produce an additional torque on the opposite side of said rolling block until the measured tension on the one side of the rolling block again attains the level of the initial tension.

2. The correction device as defined in claim 1, wherein:
    said gauging means possesses at least one strain gauge.

3. The correction device as defined in claim 1, wherein:
    said torque imposing means possesses at least one hydraulic piston.

4. The correction device as defined in claim 1, further including:
    a hydraulic pump constituting a source of energy for the torque imposing means for exerting the additional torque.

* * * * *